(12) United States Patent
Raichelgauz et al.

(10) Patent No.: US 9,652,785 B2
(45) Date of Patent: May 16, 2017

(54) SYSTEM AND METHOD FOR MATCHING ADVERTISEMENTS TO MULTIMEDIA CONTENT ELEMENTS

(71) Applicant: Cortica, Ltd., Tel Aviv (IL)

(72) Inventors: Igal Raichelgauz, New York, NY (US); Karina Odinaev, New York, NY (US); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 0 days.

(21) Appl. No.: 14/856,981

(22) Filed: Sep. 17, 2015

(65) Prior Publication Data
US 2016/0005085 A1    Jan. 7, 2016

Related U.S. Application Data

(63) Continuation of application No. 13/624,397, filed on Sep. 21, 2012, now Pat. No. 9,191,626, which is a
(Continued)

(30) Foreign Application Priority Data

Oct. 26, 2005  (IL) .......................................... 171577
Jan. 29, 2006  (IL) .......................................... 173409
Aug. 21, 2007  (IL) .......................................... 185414

(51) Int. Cl.
*G06N 5/00*        (2006.01)
*G06F 1/00*        (2006.01)
(Continued)

(52) U.S. Cl.
CPC ..... *G06Q 30/0271* (2013.01); *G06Q 30/0277* (2013.01); *H04H 20/103* (2013.01);
(Continued)

(58) Field of Classification Search
CPC ............ G06N 5/04; G06N 5/02; G06N 5/022; G06N 7/005
See application file for complete search history.

(56) References Cited

U.S. PATENT DOCUMENTS 4,733,353 A   3/1988   Jaswa
4,932,645 A   6/1990   Schorey et al.
(Continued)

FOREIGN PATENT DOCUMENTS

WO   0231764       4/2002
WO   03005242 A1   1/2003
(Continued)

OTHER PUBLICATIONS

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
(Continued)

*Primary Examiner* — Stanley K Hill
*Assistant Examiner* — Kalpana Bharadwaj
(74) *Attorney, Agent, or Firm* — M&B IP Analysts, LLC

(57) ABSTRACT

A system and method for matching an advertisement item to a multimedia content element. The method comprises: extracting at least one multimedia content element from a personalized multimedia content channel, the personalized multimedia content channel having at least one user, wherein multimedia content elements in the personalized multimedia content channel are customized for each user; generating at least one signature of the at least one multimedia content element; searching for at least one advertisement item respective of the at least one generated signature; and causing a display of the at least one advertisement item
(Continued)

within a display area of a user node associated with a user of the personalized multimedia content channel.

16 Claims, 4 Drawing Sheets

Related U.S. Application Data continuation-in-part of application No. 13/344,400, filed on Jan. 5, 2012, now Pat. No. 8,959,037, which is a continuation of application No. 12/434,221, filed on May 1, 2009, now Pat. No. 8,112,376, said application No. 13/624,397 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 13/624,397 is a continuation-in-part of application No. 12/084,150, filed as application No. PCT/IL2006/001235 on Oct. 26, 2006, now Pat. No. 8,655,801.

(51) Int. Cl.

| | | |
|---|---|---|
| *G06Q 30/02* | (2012.01) | |
| *H04H 20/10* | (2008.01) | |
| *H04H 60/66* | (2008.01) | |
| *H04N 7/173* | (2011.01) | |
| *H04N 21/258* | (2011.01) | |
| *H04N 21/2668* | (2011.01) | |
| *H04N 21/466* | (2011.01) | |
| *H04N 21/81* | (2011.01) | |
| *H04H 60/37* | (2008.01) | |
| *H04H 60/56* | (2008.01) | |

(52) U.S. Cl.
CPC ........... *H04H 60/37* (2013.01); *H04H 60/56* (2013.01); *H04H 60/66* (2013.01); *H04N 7/17318* (2013.01); *H04N 21/25891* (2013.01); *H04N 21/2668* (2013.01); *H04N 21/466* (2013.01); *H04N 21/8106* (2013.01)

(56) References Cited

U.S. PATENT DOCUMENTS

| | | | |
|---|---|---|---|
| 4,972,363 | A | 11/1990 | Nguyen et al. |
| 5,307,451 | A | 4/1994 | Clark |
| 5,568,181 | A | 10/1996 | Greenwood et al. |
| 5,806,061 | A | 9/1998 | Chaudhuri et al. |
| 5,852,435 | A | 12/1998 | Vigneaux et al. |
| 5,870,754 | A | 2/1999 | Dimitrova et al. |
| 5,873,080 | A | 2/1999 | Coden et al. |
| 5,887,193 | A | 3/1999 | Takahashi et al. |
| 5,978,754 | A | 11/1999 | Kumano |
| 6,052,481 | A | 4/2000 | Grajski et al. |
| 6,076,088 | A | 6/2000 | Paik et al. |
| 6,122,628 | A | 9/2000 | Castelli et al. |
| 6,128,651 | A | 10/2000 | Cezar |
| 6,137,911 | A | 10/2000 | Zhilyaev |
| 6,144,767 | A | 11/2000 | Bottou et al. |
| 6,147,636 | A | 11/2000 | Gershenson |
| 6,243,375 | B1 | 6/2001 | Speicher |
| 6,243,713 | B1 | 6/2001 | Nelson et al. |
| 6,329,986 | B1 | 12/2001 | Cheng |
| 6,381,656 | B1 | 4/2002 | Shankman |
| 6,411,229 | B2 | 6/2002 | Kobayashi |
| 6,422,617 | B1 | 7/2002 | Fukumoto et al. |
| 6,523,046 | B2 | 2/2003 | Liu et al. |
| 6,524,861 | B1 | 2/2003 | Anderson |
| 6,550,018 | B1 | 4/2003 | Abonamah et al. |
| 6,594,699 | B1 | 7/2003 | Sahai et al. |
| 6,611,628 | B1 | 8/2003 | Sekiguchi et al. |
| 6,618,711 | B1 | 9/2003 | Ananth |
| 6,643,620 | B1 | 11/2003 | Contolini et al. |
| 6,643,643 | B1 | 11/2003 | Lee et al. |
| 6,665,657 | B1 | 12/2003 | Dibachi |
| 6,704,725 | B1 | 3/2004 | Lee |
| 6,732,149 | B1 | 5/2004 | Kephart |
| 6,751,363 | B1 | 6/2004 | Natsev et al. |
| 6,751,613 | B1 | 6/2004 | Lee et al. |
| 6,754,435 | B2 | 6/2004 | Kim |
| 6,763,519 | B1 | 7/2004 | McColl et al. |
| 6,774,917 | B1 | 8/2004 | Foote et al. |
| 6,795,818 | B1 | 9/2004 | Lee |
| 6,804,356 | B1 | 10/2004 | Krishnamachari |
| 6,819,797 | B1 | 11/2004 | Smith et al. |
| 6,845,374 | B1 | 1/2005 | Oliver et al. |
| 6,901,207 | B1 | 5/2005 | Watkins |
| 6,938,025 | B1 | 8/2005 | Lulich et al. |
| 7,006,689 | B2 | 2/2006 | Kasutani |
| 7,013,051 | B2 | 3/2006 | Sekiguchi et al. |
| 7,020,654 | B1 | 3/2006 | Najmi |
| 7,043,473 | B1 | 5/2006 | Rassool et al. |
| 7,047,033 | B2 | 5/2006 | Wyler |
| 7,199,798 | B1 | 4/2007 | Echigo et al. |
| 7,260,564 | B1 | 8/2007 | Lynn et al. |
| 7,277,928 | B2 | 10/2007 | Lennon |
| 7,302,117 | B2 | 11/2007 | Sekiguchi et al. |
| 7,313,805 | B1 | 12/2007 | Rosin et al. |
| 7,340,458 | B2 | 3/2008 | Vaithilingam et al. |
| 7,353,224 | B2 | 4/2008 | Chen et al. |
| 7,376,672 | B2 | 5/2008 | Weare |
| 7,376,722 | B1 | 5/2008 | Sim et al. |
| 7,433,895 | B2 | 10/2008 | Li et al. |
| 7,464,086 | B2 | 12/2008 | Black et al. |
| 7,526,607 | B1 | 4/2009 | Singh et al. |
| 7,536,417 | B2 | 5/2009 | Walsh et al. |
| 7,574,668 | B2 | 8/2009 | Nunez et al. |
| 7,577,656 | B2 | 8/2009 | Kawai et al. |
| 7,657,100 | B2 | 2/2010 | Gokturk et al. |
| 7,660,468 | B2 | 2/2010 | Gokturk et al. |
| 7,660,737 | B1 | 2/2010 | Lim et al. |
| 7,694,318 | B2 | 4/2010 | Eldering et al. |
| 7,697,791 | B1 | 4/2010 | Chan et al. |
| 7,769,221 | B1 | 8/2010 | Shakes et al. |
| 7,788,132 | B2 | 8/2010 | Desikan et al. |
| 7,836,054 | B2 | 11/2010 | Kawai et al. |
| 7,860,895 | B1 | 12/2010 | Scofield et al. |
| 7,904,503 | B2 | 3/2011 | De |
| 7,920,894 | B2 | 4/2011 | Wyler |
| 7,921,107 | B2 | 4/2011 | Chang et al. |
| 7,974,994 | B2 | 7/2011 | Li et al. |
| 7,987,194 | B1 | 7/2011 | Walker et al. |
| 7,987,217 | B2 | 7/2011 | Long et al. |
| 7,991,715 | B2 | 8/2011 | Schiff et al. |
| 8,000,655 | B2 | 8/2011 | Wang et al. |
| 8,036,893 | B2 | 10/2011 | Reich |
| 8,098,934 | B2 | 1/2012 | Vincent et al. |
| 8,112,376 | B2 | 2/2012 | Raichelgauz et al. |
| 8,266,185 | B2 | 9/2012 | Raichelgauz et al. |
| 8,312,031 | B2 | 11/2012 | Raichelgauz et al. |
| 8,315,442 | B2 | 11/2012 | Gokturk et al. |
| 8,316,005 | B2 | 11/2012 | Moore |
| 8,326,775 | B2 | 12/2012 | Raichelgauz et al. |
| 8,345,982 | B2 | 1/2013 | Gokturk et al. |
| 8,548,828 | B1 | 10/2013 | Longmire |
| 8,655,801 | B2 | 2/2014 | Raichelgauz et al. |
| 8,677,377 | B2 | 3/2014 | Cheyer et al. |
| 8,682,667 | B2 | 3/2014 | Haughay |
| 8,688,446 | B2 | 4/2014 | Yanagihara |
| 8,706,503 | B2 | 4/2014 | Cheyer et al. |
| 8,775,442 | B2 | 7/2014 | Moore et al. |
| 8,799,195 | B2 | 8/2014 | Raichelgauz et al. |
| 8,799,196 | B2 | 8/2014 | Raichelquaz et al. |
| 8,818,916 | B2 | 8/2014 | Raichelgauz et al. |
| 8,868,619 | B2 | 10/2014 | Raichelgauz et al. |
| 8,880,539 | B2 | 11/2014 | Raichelgauz et al. |
| 8,880,566 | B2 | 11/2014 | Raichelgauz et al. |
| 8,886,648 | B1 | 11/2014 | Procopio et al. |
| 8,898,568 | B2 | 11/2014 | Bull et al. |
| 8,922,414 | B2 | 12/2014 | Raichelgauz et al. |

(56) References Cited

U.S. PATENT DOCUMENTS

| | | |
|---|---|---|
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,330,189 B2 | 5/2016 | Raichelgauz et al. |
| 9,438,270 B2 | 9/2016 | Raichelgauz et al. |
| 2001/0019633 A1 | 9/2001 | Tenze et al. |
| 2001/0056427 A1 | 12/2001 | Yoon et al. |
| 2002/0019881 A1 | 2/2002 | Bokhari et al. |
| 2002/0038299 A1 | 3/2002 | Zernik et al. |
| 2002/0059580 A1 | 5/2002 | Kalker et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0123928 A1* | 9/2002 | Eldering ............... G06Q 30/02 705/14.52 |
| 2002/0126872 A1 | 9/2002 | Brunk et al. |
| 2002/0129296 A1 | 9/2002 | Kwiat et al. |
| 2002/0143976 A1 | 10/2002 | Barker et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0131884 A1 | 6/2005 | Gross et al. |
| 2005/0144455 A1 | 6/2005 | Haitsma |
| 2005/0177372 A1 | 8/2005 | Wang et al. |
| 2005/0238238 A1 | 10/2005 | Xu et al. |
| 2005/0245241 A1 | 11/2005 | Durand et al. |
| 2005/0281439 A1 | 12/2005 | Lange |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0224529 A1 | 10/2006 | Kermani |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1* | 11/2006 | Barton ............... H04H 60/27 725/46 |
| 2006/0253423 A1 | 11/2006 | McLane et al. |
| 2007/0019864 A1 | 1/2007 | Koyama et al. |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0091106 A1 | 4/2007 | Moroney |
| 2007/0130159 A1 | 6/2007 | Gulli et al. |
| 2007/0168413 A1 | 7/2007 | Barletta et al. |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0294295 A1 | 12/2007 | Finkelstein et al. |
| 2008/0040277 A1 | 2/2008 | DeWitt |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0204706 A1 | 8/2008 | Magne et al. |
| 2008/0253737 A1 | 10/2008 | Kimura et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0216639 A1 | 8/2009 | Kapczynski et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0277322 A1 | 11/2009 | Cai et al. |
| 2010/0023400 A1 | 1/2010 | DeWitt |
| 2010/0042646 A1 | 2/2010 | Raichelgauz et al. |
| 2010/0082684 A1 | 4/2010 | Churchill et al. |
| 2010/0088321 A1 | 4/2010 | Solomon et al. |
| 2010/0104184 A1 | 4/2010 | Bronstein et al. |
| 2010/0106857 A1 | 4/2010 | Wyler |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0191567 A1 | 7/2010 | Lee et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0035289 A1 | 2/2011 | King et al. |
| 2011/0052063 A1 | 3/2011 | McAuley et al. |
| 2011/0055585 A1 | 3/2011 | Lee |
| 2011/0106782 A1 | 5/2011 | Ke et al. |
| 2011/0145068 A1 | 6/2011 | King et al. |

(56) References Cited

U.S. PATENT DOCUMENTS

| | | |
|---|---|---|
| 2011/0202848 A1 | 8/2011 | Ismalon |
| 2011/0208822 A1 | 8/2011 | Rathod |
| 2011/0246566 A1 | 10/2011 | Kashef et al. |
| 2011/0251896 A1 | 10/2011 | Impollonia et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0197857 A1 | 8/2012 | Huang et al. |
| 2012/0330869 A1 | 12/2012 | Durham |
| 2013/0031489 A1 | 1/2013 | Gubin et al. |
| 2013/0067035 A1 | 3/2013 | Amanat et al. |
| 2013/0086499 A1 | 4/2013 | Dyor et al. |
| 2013/0089248 A1 | 4/2013 | Remiszewski et al. |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0147829 A1 | 5/2014 | Jerauld |
| 2014/0188786 A1 | 7/2014 | Raichelgauz et al. |
| 2014/0310825 A1 | 10/2014 | Raichelgauz et al. |
| 2015/0289022 A1 | 10/2015 | Gross |

FOREIGN PATENT DOCUMENTS

| | | |
|---|---|---|
| WO | 2004019527 A1 | 3/2004 |
| WO | 2007049282 | 5/2007 |

OTHER PUBLICATIONS

Lin, et al., "Robust Digital Signature for Multimedia Authentication: A Summary", IEEE Circuits and Systems Magazine, 4th Quarter 2003, pp. 23-26.

May et al., "The Transputer", Springer-Verlag, Berlin Heidelberg, 1989, teaches multiprocessing system.

Vailaya, et al., "Content-Based Hierarchical Classification of Vacation Images," I.E.E.E.: Multimedia Computing and Systems, vol. 1, 1999, East Lansing, MI, pp. 518-523.

Vallet, et al., "Personalized Content Retrieval in Context Using Ontological Knowledge," IEEE Transactions on Circuits and Systems for Video Technology, vol. 17, No. 3, Mar. 2007, pp. 336-346.

Whitby-Strevens, "The Transputer", 1985 IEEE, Bristol, UK.

Yanai, "Generic Image Classification Using Visual Knowledge on the Web," MM'03, Nov. 2-8, 2003, Tokyo, Japan, pp. 167-176.

Wang et al. "A Signature for Content-based Image Retrieval Using a Geometrical Transform", ACM 1998, pp. 229-234.

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.

Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.

Chuan-Yu Cho, et al., "Efficient Motion-Vector-Based Video Search Using Query by Clip", 2004, IEEE, Taiwan, pp. 1-4.

Gomes et al., "Audio Watermaking and Fingerprinting: For Which Applications?" University of Rene Descartes, Paris, France, 2003.

Ihab Al Kabary, et al., "SportSense: Using Motion Queries to Find Scenes in Sports Videos", Oct. 2013, ACM, Switzerland, pp. 1-3.

Jianping Fan et al., "Concept-Oriented Indexing of Video Databases: Towards Semantic Sensitive Retrieval and Browsing", IEEE, vol. 13, No. 7, Jul. 2004, pp. 1-19.

Nam, et al., "Audio Visual Content-Based Violent Scene Characterization", Department of Electrical and Computer Engineering, Minneapolis, MN, 1998, pp. 353-357.

Shih-Fu Chang, et al., "VideoQ: A Fully Automated Video Retrieval System Using Motion Sketches", 1998, IEEE, , New York, pp. 1-2.

Wei-Te Li et al., "Exploring Visual and Motion Saliency for Automatic Video Object Extraction", IEEE, vol. 22, No. 7, Jul. 2013, pp. 1-11.

Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.

Brecheisen, et al., "Hierarchical Genre Classification for Large Music Collections", ICME 2006, pp. 1385-1388.

Boari et al, "Adaptive Routing for Dynamic Applications in Massively Parallel Architectures", 1995 IEEE, Spring 1995.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005; Entire Document.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan, et al. "Content-Based Retrieval of Music and Audio", 1997 Institute of Systems Science, National University of Singapore, Singapore (Abstract).

Freisleben et al., "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Guo et al, "AdOn: An Intelligent Overlay Video Advertising System", SIGIR, Boston, Massachusetts, Jul. 19-23, 2009.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

(56) References Cited

OTHER PUBLICATIONS

International Search Authority: "Written Opinion of the International Searching Authority" (PCT Rule 43bis.1) including International Search Report for International Patent Application No. PCT/US2008/073852; Date of Mailing: Jan. 28, 2009.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.
International Search Report for the corresponding International Patent Application PCT/IL2006/001235; Date of Mailing: Nov. 2, 2008.
IPO Examination Report under Section 18(3) for corresponding UK application No. GB1001219.3, dated May 30, 2012.
IPO Examination Report under Section 18(3) for corresponding UK application No. GB1001219.3, dated Sep. 12, 2011; Entire Document.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Jaeger, H.: "The "echo state" approach to analysing and training recurrent neural networks", GMD Report, No. 148, 2001, pp. 1-43, XP002466251 German National Research Center for Information Technology.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Ortiz-Boyer et al., "CIXL2: A Crossover Operator for Evolutionary Algorithms Based on Population Features", Journal of Artificial Intelligence Research 24 (2005), pp. 1-48 Submitted Nov. 2004; published Jul. 2005.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Semizarov et al. "Specificity of Short Interfering RNA Determined through Gene Expression Signatures", PNAS, 2003, pp. 6347-6352.
Theodoropoulos et al, "Simulating Asynchronous Architectures on Transputer Networks", Proceedings of the Fourth Euromicro Workshop on Parallel and Distributed Processing, 1996. PDP '96.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005; Entire Document.
Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.
Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002; Entire Document.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Lau, et al, "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM2011.5986211 IEEE Conference Publications.
Santos, et al., "SCORM-MPEG: an Ontology of Interoperable Metadata for Multimedia and e-Learning", 2015 23rd International Conference on Software, Telecommunications and Computer Networks (SoftCOM) Year 2015, pp. 224-228, DOI: 10.1109/SOFTCOM.2015.7314122 IEEE Conference Publications.
Wilk, et aL, "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Odinaev, et al., "Cliques in Neural Ensembles as Perception Carriers", Technion—Israel Institute of Technology, 2006 International Joint Conference on Neural Networks, Canada, 2006, pp. 285-292.

\* cited by examiner

SYSTEM AND METHOD FOR MATCHING ADVERTISEMENTS TO MULTIMEDIA CONTENT ELEMENTS

CROSS-REFERENCE TO RELATED APPLICATIONS

This application is a continuation of U.S. patent application Ser. No. 13/624,397 filed on Sep. 21, 2012, now allowed. The Ser. No. 13/624,397 Application is a continuation-in-part (CIP) of:

(a) U.S. patent application Ser. No. 13/344,400 filed on Jan. 5, 2012, now U.S. Pat. No. 8,959,037, which is a continuation of U.S. patent application Ser. No. 12/434,221, filed May 1, 2009, now U.S. Pat. No. 8,112,376;

(b) U.S. patent application Ser. No. 12/195,863, filed Aug. 21, 2008, now U.S. Pat. No. 8,326,775, which claims priority under 35 USC 119 from Israeli Application No. 185414 filed on Aug. 21, 2007, and which is also a continuation-in-part of the below referenced U.S. patent application Ser. No. 12/084,150; and (c) U.S. patent application Ser. No. 12/084,150 filed on Apr. 25, 2008, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005, and Israeli Application No. 173409 filed on Jan. 29, 2006.

All of the applications referenced above are herein incorporated by reference for all that they contain.

TECHNICAL FIELD

The present disclosure relates generally to the analysis of multimedia content, and more specifically to a system for matching a relevant advertisement to the analyzed multimedia content to be displayed as part of a web-page on a user's display.

BACKGROUND

The Internet, also referred to as the worldwide web (WWW), has become a mass media where the content presentation is largely supported by paid advertisements that are added to the web-page content. Typically, advertisements are displayed using portions of code written in, for example, hyper-text mark-up language (HTML) or JavaScript that is inserted into, or otherwise called up by documents also written in HTML and which are sent to a user node for display. A web-page typically contains text and multimedia elements that are intended for display on the user's display device.

One of the most common types of advertisements on the Internet is in a form of a banner advertisement. Banner advertisements are generally images or animations that are displayed within a web-page. Other advertisements are simply inserted at various locations within the display area of the document. A typical web-page displayed today is cluttered with many advertisements, which frequently are irrelevant to the content being displayed, and as a result the user's attention is not given to them. Consequently, the advertising price of potentially valuable display area is low because its respective effectiveness is low.

It would therefore be advantageous to provide a solution that would overcome the deficiencies of the prior art by matching an advertisement to an already existing image.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a method for matching an advertisement item to a multimedia content element. The method comprises extracting at least one multimedia content element from a personalized multimedia content channel, the personalized multimedia content channel having at least one user, wherein multimedia content elements in the personalized multimedia content channel are customized for each user; generating at least one signature of the at least one multimedia content element; searching for at least one advertisement item respective of the at least one generated signature; and causing a display of the at least one advertisement item within a display area of a user node associated with a user of the personalized multimedia content channel.

The disclosed embodiments also include a system for matching advertisement items to multimedia content elements. The system comprises a processing unit; and a memory, the memory containing instructions that, when executed by the processing unit, configure the system to: extract at least one multimedia content element from a personalized multimedia content channel, the personalized multimedia content channel having at least one user, wherein multimedia content elements in the personalized multimedia content channel are customized for each user; generate at least one signature of the at least one multimedia content element; search for at least one advertisement item respective of the at least one generated signature; and cause a display of the at least one advertisement item within a display area of a user node associated with a user of the personalized multimedia content channel.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
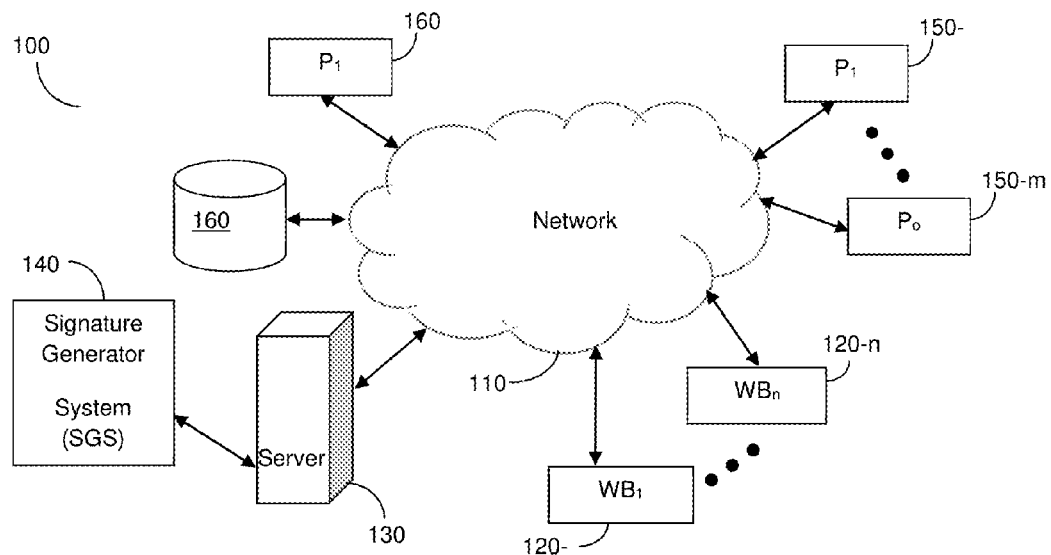
FIG. 1 is a schematic block diagram of a system for processing multimedia content displayed on a web-page according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein allow matching at least an appropriate advertisement that is relevant to a multimedia content displayed on a web-page, and analyzing the multimedia content displayed on the web-page accordingly. Based on the analysis results, for one or more multimedia content elements included the web-page, one or more matching signatures are generated. The signatures are utilized to search for appropriate advertisement(s) to be displayed in the web-page. In one embodiment, in addition to the signatures, the advertisements can be searched and used in the web-page, based on extracted taxonomies, context, and/or the user preferences.

FIG. 1 shows an exemplary and non-limiting schematic diagram of a system 100 for providing advertisements for matching multimedia content displayed in a web-page in accordance one embodiment. A network 110 is used to communicate between different parts of the system. The network 110 may be the Internet, the world-wide-web (WWW), a local area network (LAN), a wide area network (WAN), a metro area network (MAN), and other networks capable of enabling communication between the elements of the system 100.

Further connected to the network 110 are one or more client applications, such as web browsers (WB) 120-1 through 120-n (collectively referred hereinafter as web browsers 120 or individually as a web browser 120, merely for simplicity purposes). A web browser 120 is executed over a computing device including, for example, personal computers (PCs), personal digital assistants (PDAs), mobile phones, a tablet computer, and other kinds of wired and mobile appliances, equipped with browsing, viewing, listening, filtering, and managing capabilities etc., that are enabled as further discussed herein below.

A server 130 is further connected to the network 110 and may provide to a web browser 120 web-pages containing multimedia content, or references therein, such that upon request by a web browser, such multimedia content is provided to the web browser 120. The system 100 also includes a signature generator system (SGS) 140. In one embodiment, the SGS 140 is connected to the server 130. The server 130 is enabled to receive and serve multimedia content and causes the SGS 140 to generate a signature respective of the multimedia content. The process for generating the signatures for multimedia content, is explained in more detail herein below with respect to FIGS. 3 and 4. The various elements of the system 100 as depicted in FIG. 1 are also described in the above-referenced U.S. Pat. No. 8,959,037 to Raichelgauz, et al., which is assigned to common assignee, and is incorporated hereby by reference for all that it contains. It should be noted that each of the server 130 and the SGS 140, typically comprises a processing unit, such as processor (not shown) that is coupled to a memory. The memory contains instructions that can be executed by the processing unit. The server 130 also includes an interface (not shown) to the network 110.

A plurality of publisher servers 150-1 through 150-m are also connected to the network 110, each of which is configured to generate and send online advertisements to the server 130. The publisher servers 150-1 through 150-m typically receive the advertised content from advertising agencies that set the advertising campaign. In one embodiment, the advertisements may be stored in a data warehouse 160 which is connected to the server 130 (either directly or through the network 110) for further use.

The system 100 may be configured to generate customized channels of multimedia content. Accordingly, a web browser 120 or a client channel manager application (not shown), available on either the server 130, on the web browser 120, or as an independent or plug-in application, may enable a user to create customized channels of multimedia content. Such customized channels of multimedia content are personalized content channels that are generated in response to selections made by a user of the web browser 120 or the client channel manager application. The system 100, and in particular the server 130 in conjunction with the SGS 140, determines which multimedia content is more suitable to be viewed, played or otherwise utilized by the user with respect to a given channel, based on the signatures of selected multimedia content. These channels may optionally be shared with other users, used and/or further developed cooperatively, and/or sold to other users or providers, and so on. The process for defining, generating and customizing the channels of multimedia content are described in greater detail in the above-referenced U.S. Pat. No. 8,959,037.

According to the embodiments disclosed herein, a user visits a web-page using a web-browser 120. When the web-page is uploaded on the user's web-browser 120, a request is sent to the server 130 to analyze the multimedia content contained in the web-page. The request to analyze the multimedia content can be generated and sent by a script executed in the web-page, an agent installed in the web-browser, or by one of the publisher servers 150 when requested to upload on or more advertisements to the web-page. The request to analyze the multimedia content may include a URL of the web-page or a copy of the web-page. In one embodiment, the request may include multimedia content elements extracted from the web-page. A multimedia content element may include, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

The server 130 analyzes the multimedia content elements in the web-page to detect one or matching advertisements for the multimedia content elements. It should be noted that the server 130 may analyze all or a sub-set of the multimedia content elements contained in the web-page. It should be further noted that the number of matching advertisements that are provided in response for the analysis can be determined based on the number of advertisement banners that can be displayed on the web-page or pre-configured by a campaign manager. The SGS 140 generates for each multimedia content element provided by the server 130 at least one signature. The generated signature(s) may be robust to noise and distribution as discussed below. Then, using the generated signature(s) the server 130 searches the data warehouse 160 for a matching advertisement. For example, if the signature of an image indicates a "sea shore" then an advertisement for a swimsuit can be a potential matching advertisement.

It should be noted that using signatures for searching of advertisements ensures more accurate reorganization of multimedia content than, for example, when using metadata. For instance, in order to provide a matching advertisement for a sport car it may be desirable to locate a car of a particular model. However, in most cases the model of the car would not be part of the metadata associated with the multimedia content (image). Moreover, the car shown in an image may be at angles different from the angles of a specific photograph of the car that is available as a search item. The signature generated for that image would enable accurate recognition of the model of the car because the signatures generated for the multimedia content elements, according to the disclosed embodiments, allow for recognition and classification of multimedia elements, such as, content-tracking, video filtering, multimedia taxonomy generation, video fingerprinting, speech-to-text, audio classification, element recognition, video/image search and any other application requiring content-based signatures generation and matching for large content volumes such as, web and other large-scale databases.

In one embodiment, the signatures generated for more than one multimedia content element are clustered. The clustered signatures are used to search for a matching advertisement. The one or more selected matching advertisements are retrieved from the data warehouse 160 and uploaded to the web-page on the web browser 120 by means of one of the publisher servers 150.

Figure 2:
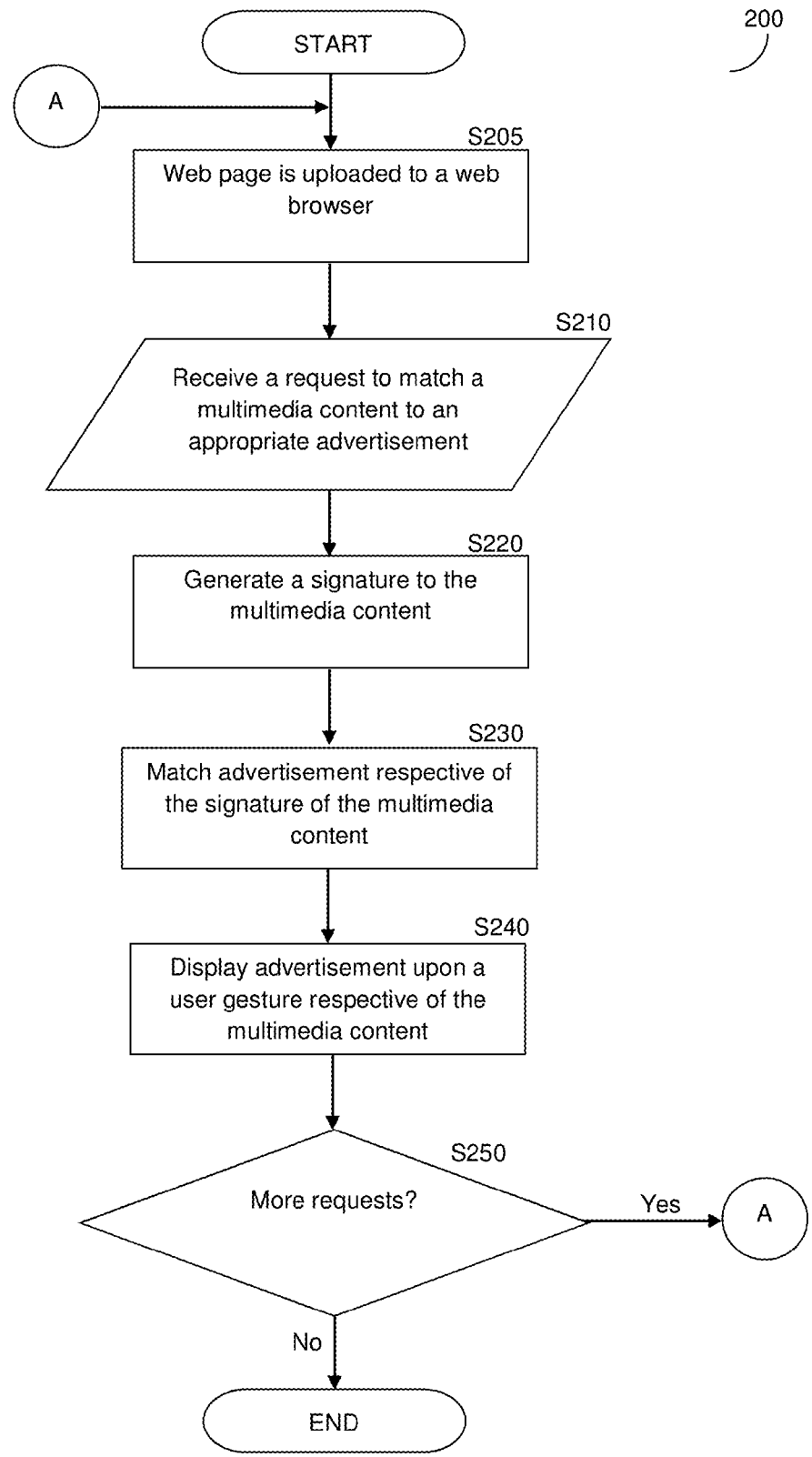
FIG. 2 is a flowchart describing the process of matching an advertisement to multimedia content displayed on a web-page according to an embodiment.

FIG. 2 depicts an exemplary and non-limiting flowchart 200 describing the process of matching an advertisement to multimedia content displayed on a web-page according to an embodiment. At S205, the method starts when a web-page is uploaded to one of the web-browsers (e.g., web-browser 120-1). In S210, a request to match at least one multimedia content element contained in the uploaded web-page to an appropriate advertisement item is received. The request can be received from a publisher server (e.g., a server 150-1), a script running on the uploaded web-page, or an agent (e.g., an add-on) installed in the web-browser. S210 can also include extracting the multimedia content elements for a signature that should be generated.

In S220, a signature to the multimedia content element is generated. The signature for the multimedia content element generated by a signature generator is described below. In S230, an advertisement item is matched to the multimedia content element respective of its generated signature. In one embodiment, the matching process includes searching for at least one advertisement item respective of the signature of the multimedia content and a display of the at least one advertisement item within the display area of the web-page. In one embodiment, the matching of an advertisement to a multimedia content element can be performed by the computational cores that are part of a large scale matching discussed in detail below.

In S240, upon a user's gesture, the advertisement item is uploaded to the web-page and displayed therein. The user's gesture may be: a scroll on the multimedia content element, a press on the multimedia content element, and/or a response to the multimedia content. This ensures that the user attention is given to the advertised content. In S250 it is checked whether there are additional requests to analyze multimedia content elements, and if so, execution continues with S210; otherwise, execution terminates.

As a non-limiting example, a user uploads a web-page that contains an image of a sea shore. The image is then analyzed and a signature is generated respective thereto. Respective of the image signature, an advertisement item (e.g., a banner) is matched to the image, for example, a swimsuit advertisement. Upon detection of a user's gesture, for example, a mouse scrolling over the sea shore image, the swimsuit ad is displayed.

The web-page may contain a number of multimedia content elements; however, in some instances only a few advertisement items may be displayed in the web-page. Accordingly, in one embodiment, the signatures generated for the multimedia content elements are clustered and the cluster of signatures is matched to one or more advertisement items.

Figure 3:
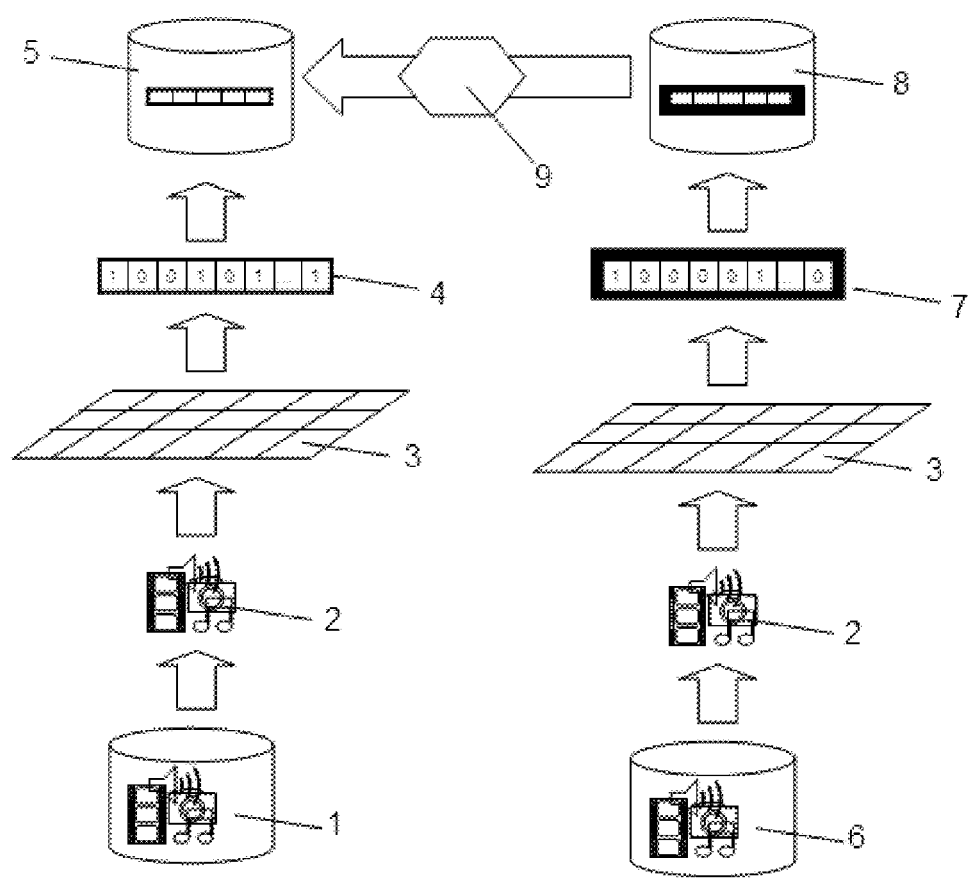
FIG. 3 is a block diagram depicting the basic flow of information in the signature generator system.
Figure 4:
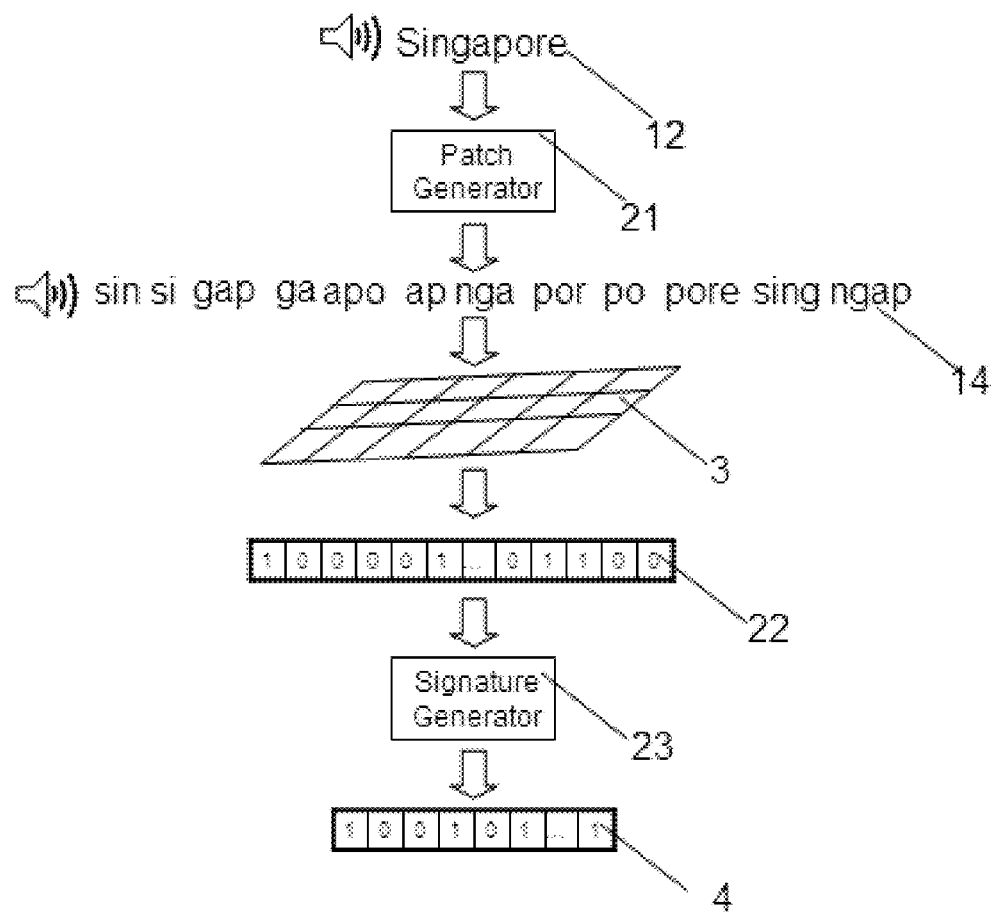
FIG. 4 is a diagram showing the flow of patches generation, response vector generation, and signature generation in a large-scale speech-to-text system.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process will now be described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \le i \le L$) may consist of a single leaky integrate-to-threshold unit (LTU) node or more nodes. The node $n_i$ equations are:

$$V_i = \sum_j w_{ij} k_j$$

$$n_i = \Pi\ (V_i - Th_x)$$

where, ⊓ is a Heaviside step function; $w_{ij}$ is a coupling node unit (CNU) between node i and image component j (for example, grayscale value of a certain pixel j); $k_j$ is an image component T (for example, grayscale value of a certain pixel j); Thx is a constant Threshold value, where x is 'j' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature (ThS) and Robust Signature ($Th_{RS}$) are set apart, after optimization, according to at least one or more of the following criteria:

1: For: $V_i > Th_{RS}$ $$1 - p(V > Th_S) = 1 - (1-\epsilon)^l \ll 1$$

i.e., given that l nodes (cores) constitute a Robust Signature of a certain image I, the probability that not all of these l nodes will belong to the Signature of same, but noisy image, Ĩ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation is discussed in more detail in the above-referenced U.S. Pat. No. 8,326,775, of which this patent application is a continuation-in-part, and is hereby incorporated by reference.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method implemented by a computing system for matching an advertisement item to a multimedia content element, comprising:
    extracting at least one multimedia content element from a personalized multimedia content channel, the personalized multimedia content channel having at least one user, wherein multimedia content elements in the personalized multimedia content channel are customized for each user;
    generating at least one signature for the at least one multimedia content element, wherein the generating further comprises processing a plurality of content segments of the multimedia content element in parallel by a plurality of independent computational cores and wherein the content segments are further broken into patches having random lengths and are located at random positions within the multimedia content element, each patch being injected into a respective one of the plurality of independent computational cores;
    searching for at least one advertisement item based on the at least one generated signature; and
    causing a display of the at least one advertisement item within a display area of a user node associated with a user of the personalized multimedia content channel.

2. The method of claim 1, wherein the at least one advertisement item is displayed based on the user node when a gesture of a user is detected by the user node.

3. The method of claim 1, further comprising:
    clustering the at least one generated signature for each of the at least one multimedia content element, wherein the at least one advertisement item is searched for based on the clustered signatures.

4. The method of claim 1, wherein the multimedia content element is at least one of: an image, graphics, a video stream, a video clip, an audio stream, an audio clip, a video frame, a photograph, and images of signals.

5. The method of claim 1, further comprising:
pushing multimedia content elements to the personalized multimedia content channel based on preferences of the associated user.

6. The method of claim 1, further comprising:
removing multimedia content elements from the personalized multimedia content channel based on preferences of the associated user.

7. A non-transitory computer readable medium having stored thereon instructions for causing one or more processing units to execute the method according to claim 1.

8. A system for matching advertisement items to multimedia content elements, comprising:
a processing unit; and
a memory, the memory containing instructions that, when executed by the processing unit, configure the system to:
extract at least one multimedia content element from a personalized multimedia content channel, the personalized multimedia content channel having at least one user, wherein multimedia content elements in the personalized multimedia content channel are customized for each user;
generate at least one signature of the at least one multimedia content element, wherein to generate the at least one signature a plurality of content segments of the multimedia content element are processed in parallel by a plurality of independent computational cores, and wherein the content segments are further broken into patches having random lengths and are located at random positions within the multimedia content element, each patch being injected into a respective one of the plurality of independent computational cores;
search for at least one advertisement item based on the at least one generated signature; and
cause a display of the at least one advertisement item within a display area of a user node associated with a user of the personalized multimedia content channel.

9. The system of claim 8, wherein the at least one advertisement item is displayed based on the user node when a gesture of a user is detected by the user node.

10. The system of claim 8, wherein the system is further configured to:
cluster the at least one generated signature for each of the at least one multimedia content element, wherein the at least one advertisement item is searched for based on the clustered signatures.

11. The system of claim 8, wherein the multimedia content element is at least one of: an image, graphics, a video stream, a video clip, an audio stream, an audio clip, a video frame, a photograph, and images of signals.

12. The system of claim 8, wherein the system is further configured to:
push multimedia content elements to the personalized multimedia content channel based on preferences of the associated user.

13. The system of claim 8, wherein the system is further configured to:
remove multimedia content elements from the personalized multimedia content channel based on preferences of the associated user.

14. A method for matching an advertisement item to a multimedia content element in a network-based system, comprising:
receiving in the network-based system from a client of at least one user an indication of at least one multimedia content element from a personalized multimedia content channel, the personalized multimedia content channel being at least for the at least one user, wherein multimedia content elements in the personalized multimedia content channel are customized for each user;
generating in the network-based system at least one signature for the at least one multimedia content element, wherein the generating further comprises processing a plurality of content segments of the multimedia content element in parallel by a plurality of independent computational cores and wherein the content segments are further broken into patches having random lengths and are located at random positions within the multimedia content element, each patch being injected into a respective one of the plurality of independent computational cores;
searching in the network-based system for at least one advertisement item based on the at least one generated signature; and
transmitting from the network-based system toward the client the at least one advertisement item, the advertising item being suitable for display within an area of the client.

15. The method of claim 1, wherein at least one of the at least one signature for the at least one multimedia content element signature is a robust signature.

16. The system of claim 8, wherein at least one of the at least one signature for the at least one multimedia content element signature is a robust signature.

* * * * *